United States Patent [19]

Nibbe et al.

[11] Patent Number: 4,481,392
[45] Date of Patent: Nov. 6, 1984

[54] DEVICE FOR COOKING FOODS WITH MICROWAVES

[76] Inventors: Bodo B. Nibbe, Karlsplatz 6/IV, 8000 München 2; Paul Hirsch, Karl-Theodor-Str. 91, 8000 München 40, both of Fed. Rep. of Germany

[21] Appl. No.: 349,964

[22] Filed: Feb. 18, 1982

[30] Foreign Application Priority Data

Feb. 20, 1981 [DE] Fed. Rep. of Germany ....... 3106236

[51] Int. Cl.³ .............................................. H05B 6/80
[52] U.S. Cl. ...................... 219/10.55 E; 219/10.55 F; 99/DIG. 14; 99/451
[58] Field of Search ................. 219/10.55 E, 10.55 F, 219/10.55 R; 99/451, DIG. 14; 426/243

[56] References Cited

U.S. PATENT DOCUMENTS

| 2,814,708 | 11/1957 | Blass ............................ 219/10.55 F |
| 4,112,833 | 9/1978 | Oda et al. ................. 219/10.55 E X |
| 4,317,017 | 2/1982 | Bowen ....................... 219/10.55 E |
| 4,354,083 | 10/1982 | Staats ........................... 219/10.55 F |

FOREIGN PATENT DOCUMENTS

| 50-119048 | 9/1975 | Japan ........................... 219/10.55 E |
| 622013 | 4/1949 | United Kingdom ......... 219/10.55 E |

Primary Examiner—Roy N. Envall, Jr.
Assistant Examiner—Philip H. Leung
Attorney, Agent, or Firm—Karl F. Ross

[57] ABSTRACT

In order to boil eggs or other foods not suitable for cooking with direct microwave radiation, a receptacle containing such foods is separated from a microwave source by a radiation shield while an adjacent heating vessel partly filled with water is exposed to the microwaves. This vaporizes the water and the resulting steam is admitted into the receptacle for a rapid heating of its contents. The shield may adjoin the vessel walls and may reflect the incident microwaves into the water bath. In a simple case, the food receptacle and its shield may be replaced by a metal foil—e.g. of aluminum—in which the foods to be boiled are loosely wrapped while lying in a shallow pool of water within the microwave-irradiated heating vessel.

4 Claims, 3 Drawing Figures

DEVICE FOR COOKING FOODS WITH MICROWAVES

FIELD OF THE INVENTION

Our present invention relates to a device for rapidly boiling food with the aid of microwaves.

BACKGROUND OF THE INVENTION

Modern cooking stoves are not infrequently provided with microwave generators designed to expedite the preparation of meals. Certain foods, however, are not suitable for cooking with direct microwave radiation since the short treatment time does not allow them to expand or otherwise adjust themselves to the rising temperatures. Among foods of this type may be metioned rice, legumes, pasta and eggs; the latter, in particular, tend to explode when irradiated with microwaves.

OBJECT OF THE INVENTION

The object of our present invention, therefore, is to provide a simple divice utilizing an available microwave source for accelerating the boiling of foods in the category referred to.

SUMMARY OF THE INVENTION

In accordance with our present invention, we partly fill a vessel with water which is then vaporized by irradiation with microwaves. The resulting steam is directed into an adjoining area which contains the foods to be treated and which is shielded against the incident microwaves. For this purpose, a device designed for the treatment of a large amount of foodstuffs comprises a receptacle disposed beneath or partly above a vessel containing a microwave-irradiated body of water, this receptacle accommodating the foods to be treated and communicating with a vapor space in the adjoining vessel for admitting steam evolving from the irradiated water; the contents of the receptacle are protected from the microwaves by a radiation shield which may form a removable cover for that receptacle.

According to a more particular feature of our invention, applicable particularly to a device in which the vaporizing vessel overlies the food-containing receptacle, the radiation shield may be provided with a microwave-reflecting layer—such as a metal foil or grid—which may be coated upon or embedded in a shell of thermally insulating ceramic, vitreous or plastic material. Microwaves reflected by that shield may then be directed into the water compartment of the vaporizing vessel which for this purpose advantageously is interposed between the shield and the microwave source; with the walls of that vessel permeable to infrared radiation, the water contained therein will be heated by both incident and reflected microwaves.

BRIEF DESCRIPTION OF THE DRAWING

The above and other features of our invention will now be described in detail with reference to the accompanying drawing in which.

SPECIFIC DESCRIPTION

Figure 1:
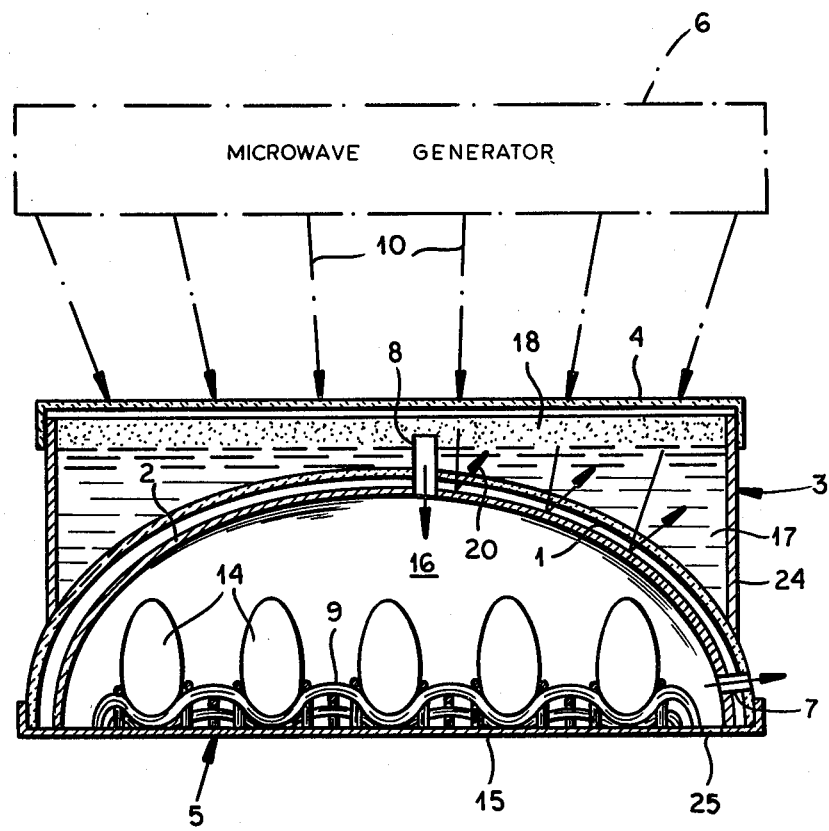
FIG. 1 is a partly diagrammatic cross-sectional view of a device embodying our invention.

In FIG. 1 we have schematically indicated a microwave generator 6 which may form part of a cooling stove not otherwise illustrated. A food receptacle 5 disposed in the path of emitted microwaves 10 has a bottom 15 overlain by a cover 2 which is designed as a radiation shield of poorly heat-conductive material provided with a radiation-reflecting layer, e.g. a coating of aluminum, preventing these microwaves from reaching an underlying steam chamber 16. The upwardly convex shield 2 is overlain with small spacing by a correspondingly shaped bottom 1 of a heating vessel 3 also having a peripheral wall 24 and a lid 4; at least the vessel bottom 1 and the lid 4 consist of radiation-permeable material such as glass, ceramic or plastic. The lower part of vessel 3 forms a water compartment 17 while its upper part constitutes a vapor space 18; the latter communicates via one or more tubes 8 with chamber 16 so that steam evolving in vessel 3 can enter the receptacle 5 to boil the foods contained therein, here shown as eggs 14 supported above bottom 15 by a metallic wire grid 9. Tube or tubes 8 must, of course, be long enough to project above the highest water level in compartment 17. One or more exit ports 7 allow for the escape of excess steam from chamber 16 into the surrounding atmosphere; these ports may be connected to a nonillustrated suction line associated with the microwave generator 6. Bottom 15 has at least one drain opening 25 for the discharge of condensed water.

In operation, microwaves 10 pass through lid 4 into heating vessel 3 and thence through its bottom 1 to radiation shield 2 where they are reflected back into the vessel as indicated at 20. The water in compartment 17 is thereby rapidly vaporized so that steam from space 18 passes through tube or tubes 8 into chamber 16 and boils the eggs 14. We have found that, by this means, eggs will need only between 60 and 90 seconds to reach a state attained in 3 minutes of conventional boiling.

Figure 2:
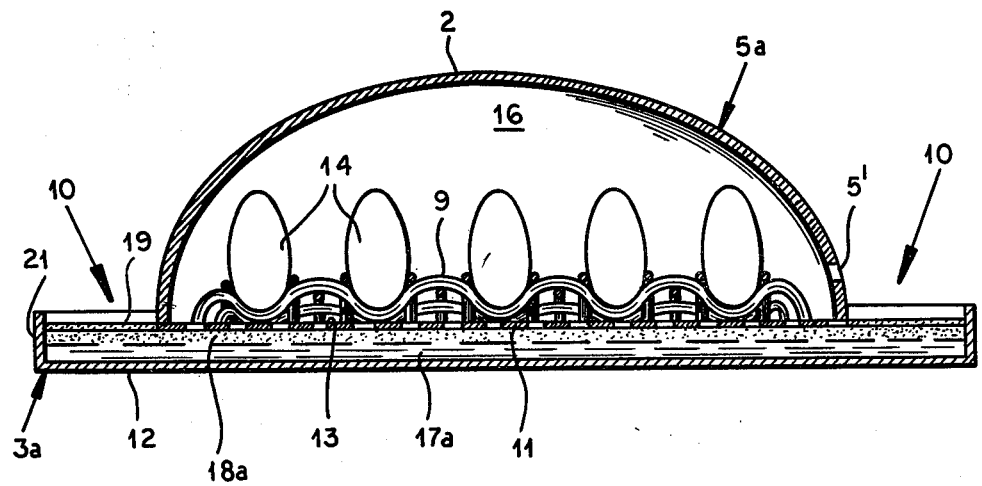
FIG. 2 is a view similar to FIG. 1 illustrating another embodiment.

In FIG. 2 we have shown a modified device whose food receptacle 5a differs from that of FIG. 1 in that its bottom 13 is perforated to admit steam from a vapor space 18a of a heating vessel 3a underlying that receptacle. Vessel 3a has a bottom 12 and a peripheral wall 21 defining a water compartment 17a separated by vapor space 18a from receptacle bottom 13. A lateral extension 19 of that receptacle bottom forms an imperforate lid above vapor space 18a which is permeable to the vertically incident microwaves 10. The radiation shield 2 covering the cooking chamber 16 need not be microwave-reflective in this instance.

Figure 3:
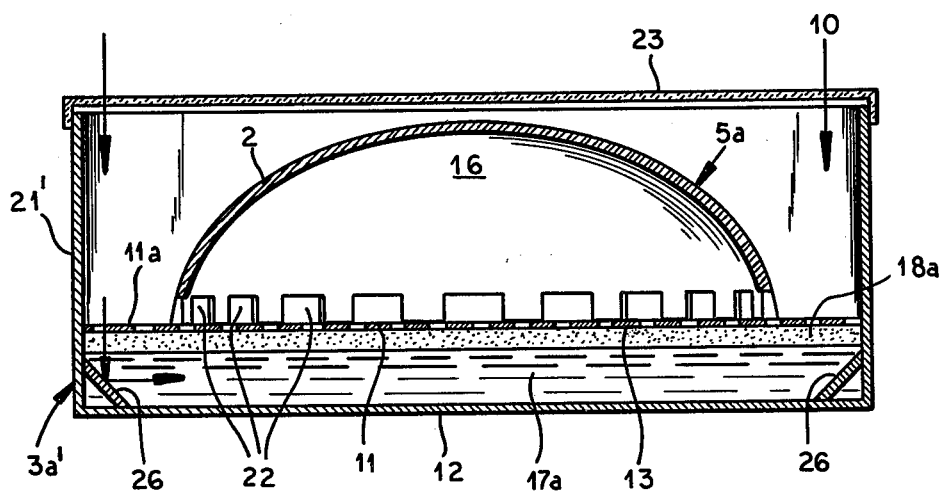
FIG. 3 is a further cross-sectional view showing a modification of the device of FIG. 2.

For a more effective heating of the water in compartment 17a by the incident radiation, that compartment may be provided with an inclined peripheral surface as illustrated at 26 in FIG. 3 for a modified heating vessel 3a'. This vessel has a peripheral wall 21' rising above the level of shield 2 and carrying a microwave-transparent lid 23 overlying that shield. The imperforate lid 19 of FIG. 2 is here replaced by an apertured extension 11a of receptacle bottom 11 so that steam evolving in space 18a can rise into the overlying volume of vessel 3a' and can enter the chamber 16 also by way of peripheral cutouts 22 at the bottom edge of shield 2. Reflecting surface 26, inclined at 45° to the vertical, directs downwardly incident radiation 10 generally horizontally to the interior of water compartment 17a while avoiding the possibility that microwaves may enter the steam chamber 16. That chamber, of course, may be provided also in the embodiment of FIGS. 2 and 3 with one or more vents and drains for the escape of excess steam and for the discharge of condensed water as described above with reference to FIG. 1.

In all instances, the food receptacle and the heating vessel may be of circular, polygonal or other horizontal outline.

We claim:

1. A device usable with a cooking stove equipped with a microwave source for rapidly boiling foods not suitable for cooking with direct microwave radiation, comprising:

a vessel positionable below said source in a field of microwaves incident from above, said vessel comprising a metallic bottom and a metallic peripheral wall, said vessel forming a vapor space above an area reserved for a quantity of water to be vaporized by incident microwaves;

a receptacle overlying part of said vessel and communicating with said vapor space for admitting evolving steam to foods disposed in said receptacle; and a radiation shield covering said receptacle for protecting the contents thereof from said microwaves, said receptacle and said radiation shield leaving a portion of said vessel exposed to microwaves incident from above, said area extending into said exposed portion.

2. A device as defined in claim 1 wherein said exposed portion extends along the periphery of said vessel around said receptacle, the latter having an apertured bottom giving access to steam rising from said vessel.

3. A device as defined in claim 2 wherein said exposed area is bounded by an inclined peripheral surface below the water level reflecting the incident microwaves generally horizontally into the interior of said vessel.

4. A device as defined in claim 2 or 3 wherein said vessel is a lower part of a housing spacedly surrounding said receptacle and forming an extended vapor space therearound closed by a microwave-permeable lid spacedly overlying said exposed portion and said radiation shield, the latter being provided with peripheral cutouts connecting the interior of said receptacle with said extended vapor space for enabling the evolving steam to envelop said receptacle on all sides.

* * * * *